United States Patent [19]

Goldscher

[11] 4,163,803

[45] Aug. 7, 1979

[54] TURMERIC COLORING PROCESS AND COMPOSITION FOR FOODS AND BEVERAGES

[76] Inventor: Kenneth J. Goldscher, 600 Red Lion Rd., Apt. E12, Philadelphia, Pa. 19115

[21] Appl. No.: 926,226

[22] Filed: Jul. 19, 1978

[51] Int. Cl.$^2$ .......................... A23L 1/22; A23L 1/275
[52] U.S. Cl. .................................... 426/250; 426/540; 426/650; 426/651; 426/590
[58] Field of Search ............... 426/250, 540, 651, 262, 426/650, 590; 260/236.5

[56] References Cited

U.S. PATENT DOCUMENTS

| | | | |
|---|---|---|---|
| 142,891 | 9/1873 | Bogart | 426/540 |
| 163,610 | 5/1875 | Rorick | 426/540 |
| 2,925,344 | 2/1960 | Peat et al. | 426/651 |
| 3,340,250 | 9/1967 | Sair et al. | 426/540 |
| 3,906,116 | 9/1975 | Quesnel | 426/651 |
| 3,940,504 | 2/1976 | Jackel | 426/540 |

Primary Examiner—Jeanette M. Hunter
Attorney, Agent, or Firm—Beveridge, DeGrandi, Kline & Lunsford

[57] ABSTRACT

Reducing or eliminating the undesirable bitter principal from curcumin-containing turmeric or derivatives of turmeric such as solvent extracts or debittered solvent extracts by the addition thereto of a glycine.

16 Claims, No Drawings

TURMERIC COLORING PROCESS AND COMPOSITION FOR FOODS AND BEVERAGES

DESCRIPTION OF INVENTION

This invention relates to the addition of glycine containing compounds as a flavoring agent to all compounds that comprise curcumin with or without the fibrous part of natural turmeric, including solvent extracts of turmeric and debittered extracts of turmeric obtained through selective solvent extraction (For example, U.S. Pat. No. 3,340,250) to produce a yellow color from either a debittered turmeric or an even more debittered turmeric from compounds which had previously been debittered somewhat through solvent extraction.

Turmeric is a spice used in the food industry in many different products as a coloring agent and as a seasoning. It is used in connection with pickles, poultry products, soups, salad dressings, mustard, gelatins and puddings, non-alcoholic beverages, and condiments. It is used more for its color value, however, than for its flavoring properties. Natural turmeric contains a bitter principal, which can be removed by extracting the volatile oil. Turmeric also has an oleoresin that contains curcumin, the major color constituent.

The color value of natural turmeric can be concentrated in two ways. In process No. 1, the solvents extract the essential oil along with the oleoresin and curcumin. It is the essential oil that contains the bitter principal. When the solvents are distilled, most of the essential oil with its bitter principal remains with the oleoresin. The product of this process can be characterized as being very bitter.

In process No. 2, certain selective solvents are employed to remove the essential oil with its bitter principal leaving the oleoresin with its curcumin. The product of this process has been acceptably debittered, though not totally undetectable.

The present invention is intended to provide a means of obtaining a virtually, bitter free turmeric for flavoring as a spice and a virtually, bitter free oleoresin of turmeric for coloring without loss of curcumin value.

I have discovered that by adding glycine to natural turmeric and the finished product of the solvent extraction method described as process No. 1, the level of bitterness is appreciably reduced. I have also discovered that by adding glycine to the debittered turmeric, the finished product of the solvent extraction method described as process No. 2, the level of bitterness is reduced to the point where it is virtually undetectable.

Glycine, sometimes referred to as Glycocoll, Aminoacetic acid, and Aminoethanoic acid, is characterized by its empirical formula $C_2H_5O_2N$ and by its structure $NH_2CH_2COOH$ herein after referred as Glycine. Glycine is very soluble in water, insoluble in alcohol and ether, and slightly soluble in acetone and pyridine. Organoleptically, its taste can be characterized as being sweet.

Glycine occurs naturally from gelatin and silk fibroin. However, it can also be synthesized from the following sources: chloroacetic acid and ammonia; from protein sources, such as gelatin and silk fibroin; from ammonium bicarbonate and sodium cyanide; by catalytic cleavage of serine; and from hydrobromic acid and methyleneaminoacetonitrile. Glycine exists in many forms, such as purified hydrolyzed vegetable protein, alpha-glycine, betaglycine, gamma-glycine, glycine hydrochloride, cationic and anionic salts of glycine, and combinations thereof.

Ratios of glycine to turmeric are varied with the specific food system used by first adding the turmeric to get the desired color intensity, and then adding glycine to reduce the bitterness to the desired level. Any suitable ratio of glycine to turmeric or any curcumin containing compounds may be used. However, the user should be careful to use enough glycine in proportion to the turmeric to be sure to prevent the bitter taste from presenting itself. The results in the following examples afford illustrative guidance over a broad spectrum of situations. In any case where this may not pinpoint the actual specific values to be used, a glycine to turmeric weight ratio of 0.1 to 5 should be used initially with adjustments if necessary to give the desired results.

EXAMPLE I

In this experiment, I used 6 types of commercially prepared turmerics:
1. Entrapped Spray Dried Turmeric
2. Purified Turmeric Powder(debittered)
3. Spray Dried Turmeric(debittered)
4. Oleoresin Turmeric
5. Water Dispersable Turmeric(debittered)
6. Water Soluble Turmeric(debittered)

Procedure:
1. Prepared sample using approximately 10 grams of sucrose in about 4 fl. oz. of water.
2. I then added enough of the turmeric(approximately 0.1 grams) to the sugar water so that the bitter principal was easily detectable.
3. This sample was then split into 2 equal portions. To one of the portions, I added approximately 0.05 grams of glycine.
4. The 2 samples were compared for bitterness by a panel of consumer tasters according to established taste testing methods.
5. The above procedure was repeated for each of the turmeric products listed above.

Results:
In each case, with each different type of turmeric, the panel singled out one portion as being very bitter. The portion that was singled out as being bitter contained the turmeric only. The other portion contained both turmeric and glycine.

EXAMPLE II

Procedure:
1. Prepared a sample using about 20 grams of commercial orange breakfast drink in about 8 fl. oz. of water.
2. I then added about 0.047 grams of water soluble turmeric, so that the bitter principal was easily detectable.
3. Approximately ⅓ of the sample was poured into a plastic cup. This sample was labeled- Sample A.
4. To the remainder of the original sample, I added approximately 0.025 grams of glycine. This was now separated into 2 equal portions labeled- Sample B and Sample C.
5. The unidentified samples labeled A and B, were presented to a consumer panel of tasters according to established triangle taste testing methods.

The samples were compared for bitterness.
6. Sample A- contained turmeric
   Sample B- contained turmeric and glycine Sample C- contained turmeric and glycine Results:

The taste panel selected Sample A out of the 3 being compared as being very bitter. The other 2 samples were reported as tasting the same and typical of orange breakfast drink.

EXAMPLE III

Procedure:
1. Prepared a sample of white frosting mix.
2. I added water soluble turmeric until the white frosting became a lemon colored frosting.
3. The lemon colored frosting was then divided into 2 equal portions, A and B.
4. To Sample B, I added a required amount of glycine and mixed thoroughly.
5. An additional sample of white frosting was prepared with no turmeric or glycine added for use as a standard.

Results:

Sample A, which contained the turmeric only, was very bitter. Sample B, which contained both the turmeric and glycine was virtually indistinguishable from the standard by taste. There was no detectable bitterness.

EXAMPLE IV

Procedure:
1. Prepared approximately 40 grams of commercial orange breakfast drink in about 16 fl. oz. of water. This was divided into 2 portions, one of which was used as a standard.
2. To the other portion, I added enough of the water soluble turmeric to detect a bitter principal.
3. This portion was divided into 2 equal samples, A and B.
4. To sample B, I added enough of the glycine to reduce the bitterness to a level where it was virtually undetectable, using the standard portion as a reference.

Results:

In this experiment, it took 0.05 grams of glycine to debitter 0.095 grams of turmeric or about 1 part glycine to debitter 2 parts of turmeric.

EXAMPLE V

Procedure:
1. Prepared a sample of commercial, unflavored gelatin and sugar for use as a standard.
2. Prepared a second sample of commercial, unflavored gelatin and sugar to which I added enough of the water soluble turmeric to give the gelatin a lemon color.
3. The second sample was separated into 2 equal portions, A and B.
4. Using the standard for comparison, I added enough glycine to Sample A so that the bitterness had been significantly reduced.
5. All three samples were placed in the refrigerator to harden.

Results:
  Standard- almost no flavor; a little sweet
  Sample B- typically bitter; good lemon color
  Sample A- no detectable bitterness; close resemblance to standard in taste; good lemon color

Having thus described my invention what I claim as new and desire to secure by Letters Patent is:

1. An edible composition for coloring or flavoring a food or beverage, said composition comprising
   (a) turmeric or a derivative of turmeric containing curcumin, wherein said turmeric or turmeric derivative have a bitter taste; and
   (b) a glycine in an amount sufficient to substantially reduce or eliminate said bitter taste.
2. Composition according to claim 1 in which said glycine is at least one member selected from the group consisting of purified hydrolyzed vegetable protein, alphaglycine, beta-glycine, gamma-glycine, glycine hydrochloride, a cationic salt of glycine and an anionic salt of glycine.
3. Composition according to claim 2 in which said turmeric is a natural turmeric having a yellow color.
4. Composition according to claim 2 in which said turmeric derivative is a solvent extract of turmeric containing curcumin and having a yellow color.
5. Composition according to claim 1 in which said turmeric derivative is an oleoresinous extract of turmeric.
6. An edible composition having a yellow color and comprising
   a food and an effective amount of
   the coloring composition of claim 1.
7. An edible composition having a yellow color and comprising
   a beverage and
   the coloring composition of claim 1.
8. A method for the preparation of the composition of claim 1 comprising:
   (a) adding a glycine to turmeric or a derivative of turmeric containing curcumin; and
   (b) blending the mass resulting from step (a) to obtain a substantially homogeneous composition; wherein said turmeric or turmeric derivative has a bitter taste, and said glycine is added in an amount sufficient to substantially reduce or eliminate said bitter taste.
9. Method according to claim 8 in which said glycine is at least one member selected from the group consisting of purified hydrolyzed vegetable protein, alpha-glycine, beta-glycine, gamma-glycine, glycine hydrochloride, a cationic salt of glycine and an anionic salt of glycine.
10. Method according to claim 9 in which said turmeric or turmeric derivative is selected from the group consisting of a natural turmeric having a yellow color, a solvent extract of turmeric containing curcumin and having a yellow color and an oleoresin derived from turmeric containing curcumin and having a yellow color.
11. A method of coloring or flavoring a food comprising:
   (a) adding to a food the composition of claim 1 in an amount sufficient to color or flavor said food; and
   (b) blending the mass resulting from step (a) to obtain a substantially homogeneously colored and flavored food product.
12. Method according to claim 11 in which said glycine is at least one member selected from the group consisting of purified hydrolyzed vegetable protein, alpha-glycine, beta-glycine, gamma-glycine, glycine hydrochloride, a cationic salt of glycine and an anionic salt of glycine.
13. Method according to claim 12 in which said turmeric or turmeric derivative is selected from the group consisting of a natural turmeric having a yellow color, a solvent extract of turmeric containing curcumin and having a yellow color and an oleoresin derived from turmeric containing curcumin and having a yellow color.

14. A method of coloring or flavoring a beverage, said method comprising:
   (a) adding to a beverage the composition of claim 1 in an amount sufficient to color or flavor said beverage; and
   (b) blending the mass resulting from step (a) to obtain a substantially homogeneously colored and flavored beverage product.

15. Method according to claim 14 in which said glycine is at least one member selected from the group consisting of purified hydrolyzed vegetable protein, alpha-glycine, beta-glycine, gamma-glycine, glycine hydrochloride, a cationic salt of glycine and an anionic salt of glycine.

16. Method according to claim 15 in which said turmeric or derivative of turmeric is selected from the group consisting of a natural turmeric having a yellow color, a solvent extract of turmeric containing curcumin and having a yellow color and an oleoresin derived from turmeric containing curcumin and having a yellow color.

* * * * *